United States Patent [19]

Topel et al.

[11] Patent Number: 4,785,988

[45] Date of Patent: Nov. 22, 1988

[54] ATTACHMENT OF LEAD TO ELONGATED CONDUCTOR

[75] Inventors: Edward C. Topel, Worth; Mario Garritano, Oak Lawn, both of Ill.

[73] Assignee: Methode Electronics, Inc., Chicago, Ill.

[21] Appl. No.: 927,257

[22] Filed: Nov. 20, 1986

[51] Int. Cl.⁴ .................... B23K 31/02; B23K 35/14
[52] U.S. Cl. .................... 228/122; 228/253; 228/255; 228/56.3; 228/263.12; 219/203
[58] Field of Search ............... 228/120, 122, 136, 210, 228/253, 255, 14, 41, 56.3, 263.12; 219/203

[56] References Cited

U.S. PATENT DOCUMENTS

| | | | |
|---|---|---|---|
| 2,386,628 | 10/1945 | Nazzewski | 228/122 |
| 3,333,047 | 7/1967 | Geoffroi | 228/255 |
| 3,705,047 | 12/1972 | Marriott | 219/203 |
| 3,978,569 | 9/1976 | Cobaugh et al. | 228/255 |
| 4,090,768 | 5/1978 | Tregoning | 228/255 |

FOREIGN PATENT DOCUMENTS

| | | | |
|---|---|---|---|
| 2131369 | 1/1973 | Fed. Rep. of Germany | 228/255 |
| 3312190 | 4/1984 | Fed. Rep. of Germany | 228/255 |
| 4846 | 1/1979 | Japan | 228/255 |
| 732710 | 6/1955 | United Kingdom | 219/203 |
| 1426873 | 3/1976 | United Kingdom | 228/123 |

Primary Examiner—Nicholas P. Godici
Assistant Examiner—Samuel M. Heinrich
Attorney, Agent, or Firm—Charles F. Pigott, Jr.; Garrettson Ellis

[57] ABSTRACT

A solder button may be attached to an elongated conductor by substantially surrounding a portion of the conductor with a mass of solder. The mass of solder may be crimped or heat welded into fixed position onto the elongated conductor, which is typically in ribbon form, with the solder being cut from a strip of solder by cutting and crimping means, the strip of solder being in transverse relation to the conductor at the crimping means. The elongated conductor, with attached solder buttons, may be attached by automated means in a single step to a pane of glass or the like.

5 Claims, 1 Drawing Sheet

U.S. Patent      Nov. 22, 1988      4,785,988
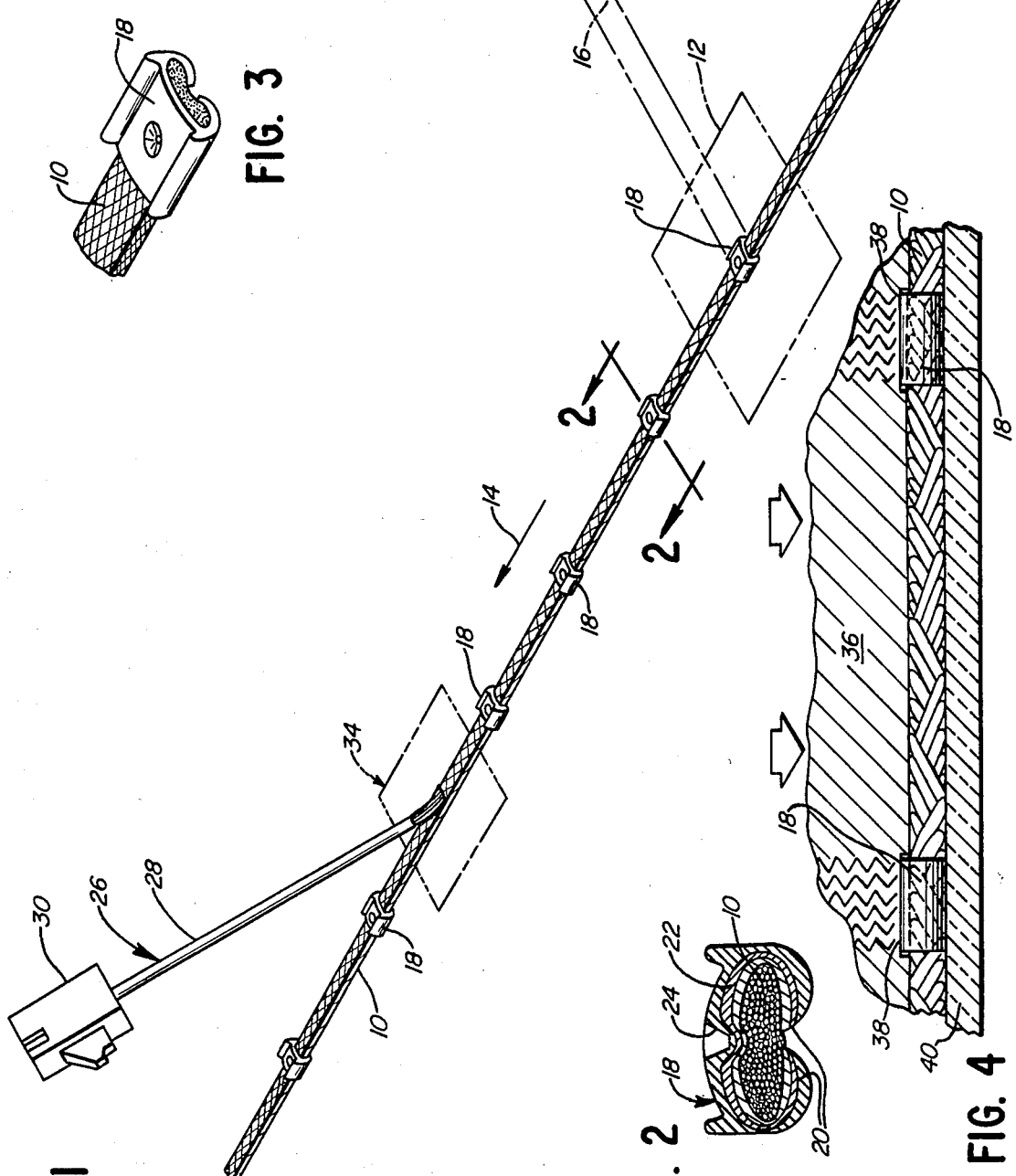

ATTACHMENT OF LEAD TO ELONGATED CONDUCTOR

BACKGROUND OF THE INVENTION

In automotive technology, conductors in ribbon form are mounted as part of a rear window defrosting grid, or to provide power to the rear window stop light, which is a widely used new device.

Typically, a woven conductive metal strip is mounted on the rear window by manual and conventional soldering of the strip to the window. Such a process is slow and time consuming, requiring relatively skilled labor to obtain reliable and good solder joints. Additionally, the process is not automatable, which would be greatly desired in any manufacturing process.

In accordance with this invention, an automatable process is provided for preparing an elongated conductor for soldering to a surface such as a glass window, for any desired use, but particularly in the transportation industry for automobiles, airplanes and the like. Specifically, the invention is useful in the preparation of parts for assembly into a rear window defrosting grid system.

DESCRIPTION OF THE INVENTION

In accordance with this invention a method is provided for attaching solder buttons to an elongated conductor, including the steps of substantially surrounding a portion of the conductor with a mass of solder, and crimping or heat welding the solder mass to said conductor, to cause the solder mass to be affixed in place.

Typically, the mass of solder may be crimped into its affixed and substantially surrounded relation with the elongated conductor at exposed conductive portions of the conductor. Any insulation present is stripped away at the site of crimping prior to performing the process.

The solder used preferably has a melting point of no more than about 900° F., such solder being commonly characterized as a "soft solder". The solder also preferably contains no more than 10 weight percent of silver. A small amount, for example 1 to 5 percent, of similar may be present if it is desired to counterbalance migration of the silver from the glass frit which would tend to weaken bonding of the conductors to a rear window or the like.

The mass of solder may be cut from a strip of solder by cutting (and crimping) means, and formed to substantially surround a portion of the conductor. The crimping or heat welding may then take place to affix the solder mass in place. The strip of solder is preferably positioned in a transverse relation to the conductor at the crimping means, so that the strip may be advanced as pieces of solder are cut from the strip and applied by forming to the conductor.

Specifically, the elongated conductor may be a flat, braided ribbon, about which a flat piece of the solder ribbon may be applied. Preferably the conductor is made of a plurality of metal wire strands.

With braided material, the headed solder mass tends to sink into the braided structure between the braids, and also in between the individual strands of the lead when a multistrand lead is used, to provide a connection of great strength, durability and stability.

Accordingly the process of this invention can be used to make novel, preformed sections of braided ribbon with attached solder buttons in a substantially automated manner, making use of a continuous feed of braided ribbon wire and a strip of solded. Preferably, the solder strip has an internal flux, such solder strips being commercially available. The forming action that initially takes place to form solder buttons on the mass of solder so that it will not be lost, pending the heat welding of the mass of solder to a surface such as a window. The use of solder flux, which is well-known, facilitates the bonding of the conductor to glass surface or the like.

DESCRIPTION OF DRAWINGS

In the drawings, FIG. 1 is a respective view of an elongated conductor in braided ribbon form carrying spaced masses of solder that are being applied in an automated manner, some parts being shown schematically;

FIG. 2 is a sectional view taken along line 2—2 of FIG. 1;

FIG. 3 is a fragmentary perspective view, with a portion broken away, of a mass of solder as applied to the elongated conductor; and FIG. 4 is an enlarged elevational view showing the elongated conductor and its carried solder buttons in the process of being sealed to a pane of glass, such as an automobile rear window having a defrosting grid.

DESCRIPTION OF SPECIFIC EMBODIMENTS

Referring to the drawings, FIG. 1 shows a strip of braided copper conductive ribbon 10 which is intended for use as a part for providing power to a rear window defrosting grid of an automobile.

As shown, crimping die 12, which may be of conventional design, receives conductor 10 as it is advanced in a direction indicated by arrow 14. Specifically, crimping die 12 may be of the type manufactured by AMP, Inc. of Harrisburg, Pa. modified in an appropriate manner to accomplish the purpose.

Solder strip 16 is also advanced by conventional means into crimping die 12 in intersecting relation with conductor ribbon 10. Within crimping die 12, a segment of solder strip 16 is separated and bent to form a crimped portion 18, having side edges 20 that are bent around the opposed side of conductor 10 as shown in FIG. 2, for firm retention of solder mass 18.

The particular solder mass that is shown contains an inner flux 22 which remains substantially sealed by the action of crimping die 12 within the solder shape. Such solder strips with appropriate flux are presently commercially offered. Rosin type fluxes and water soluble type fluxes are most commonly used, with the specific solder used in the specific embodiment illustrated of this invention being, for example, a conventional mixture of lead tin, silver, and bismuth. One specific solder which may be used in accordance with this invention is a soft solder, sold by Alpha Metals of Jersey City, N.J.

Dimple 24 is formed in the solder mass 18 to assist in locking solder mass or button 18 in position by crimping on flat conductor 10. Alternatively, die 12 may bend solder mass 18 around conductor strip 10, followed by heat welding of solder mass 18 to conductor 10.

It can be seen that solder strip 16 approaches conductor ribbon 10 at substantially right angles for presentation to the crimping die and easy cutting and crimping, Other angles may also be used as may be convenient, with the angles being preferably from 30° to 150°.

Lead 26 may be attached to conductor 10, typically by conventional resistance welding at station 34. Lead 26 comprises lead body 28 and a connector 30 of any desired and conventional design.

The weight of each crimped, preformed mass of solder 18 can be controlled to a specific value of plus or minus only about 0.1 gram. Thus, solder waste can be eliminated. Furthermore, the crimped solder masses for buttons 18 can be positioned on conductor 10 with center-to-center dimensional tolerances of plus or minus about 0.008 inch. Thus is many instances locating templates are not needed in the process of this invention, since an automated crimping die 12 working in conjunction with a predetermined advancement rate of conductor 10 can provide such tolerance with conventional equipment. Specifically, such conventional equipment is purchased from the Origa C. of Sweden. Machines for traversing the parts may be purchased from the Auriga Corporation of Elmhurst Ill.

Additionally, the method of this invention eliminates the need for an end solidification weld on conductor strip 10.

The specific ribbon conductor 10 as shown may be 12 gauge and about 0.187 inch in width. To this is added each mass of solder 18, in substantially surrounding relation with conductor 10, where the original solder strip has a thickness of 0.218 inch and a width of 0.040 inch (each having a typical deviation of plus or minus 0.002 inch).

Accordingly, a highly automatable process is provided to produce a conductor having attached solder buttons with great strength, reliability, and manufacturing efficiency.

FIG. 4 shows how a conductor 10, carrying buttons 18, can be attached to a pane of glass 40 by robot means in automated manner. Frame 36 of the robot means holds conductor 10 in position, while heated dies 38 press solder buttons 18 into firm contact with glass pane 40, heating them to melting so that they flow into sealed, adhering contact with both the glass pane 40 and conductor 10. Then the solder button sites are cooled to permit resolidification. The resulting joint between members 10, 40 is very strong. It has been found that a longitudinal force of 30 to 50 pounds is typically required to break the connection between conductor 10 and a glass pane.

The above has been offered for illustrative purposes only, and is not intended to limit the scope of the invention of this application, which is as defined in the claims below.

That which is claimed is:

1. The method of attaching a solder button to an elongated, linear conductor, which comprises:
   moving the end of a strip of solder in a transverse direction into engagement with said elongated, linear conductor; cutting a mass of solder from the end of said strip of solder; attaching said mass of solder into substantially surrounding and affixed relation with the elongated conductor, said strip of solder containing an internal flux enclosed within the solder of said strip, said cutting step of the mass of solder from the end of the strip of solder being performed to keep a substantial amount of said flux sealed within said solder as the mass of solder is attached to the elongated conductor; moving one of said linear conductor and strip of solder along the axis of said conductor; cutting a second mass of solder from the end of said strip of solder; attaching said second mass of solder into substantially surrounding and affixed relation with the elongated conductor in such a manner that a substantial amount of said internal flux within the solder of said strip is sealed within said solder as the mass of solder is attached to the elongated connector, said second mass of solder being spaced from the previous mass of solder; and thereafter heat welding the masses of solder attached to said elongated conductor to a pane of glass.

2. The method of claim 1 in which each mass of solder is crimped into substantially surrounding and affixed relation with the elongated conductor.

3. The method of claim 2 in which said conductor is in ribbon form and comprises a plurality of metal wire strands.

4. The method of claim 3 in which said solder has a melting point of no more than 900° F.

5. The method of claim 4 in which said solder contains from 1 to 10 weight percent of silver.

* * * * *